US006246001B1

(12) United States Patent
Fukui

(10) Patent No.: US 6,246,001 B1
(45) Date of Patent: Jun. 12, 2001

(54) METHOD FOR MANUFACTURING A GROUNDING CONSTRUCTION FOR A PLURALITY OF SHIELDED CABLES AND A GROUNDING CONSTRUCTION

(75) Inventor: Eiichi Fukui, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/525,289

(22) Filed: Mar. 15, 2000

(30) Foreign Application Priority Data

Mar. 15, 1999 (JP) ..................................... 11-069246

(51) Int. Cl.[7] .......................................... H02G 15/02
(52) U.S. Cl. ................................................ 174/78
(58) Field of Search .............................. 174/74 R, 75 C, 174/78, 88 R, 88 C

(56) References Cited

U.S. PATENT DOCUMENTS

| | | | |
|---|---|---|---|
| 3,280,246 | * 10/1966 | Lawson et al. | 174/88 R |
| 3,465,092 | * 9/1969 | Schwartz | 174/78 |
| 4,650,274 | 3/1987 | Schmid . | |
| 4,773,879 | 9/1988 | Pauza . | |
| 5,432,300 | * 7/1995 | Fujisawa et al. | 174/74 R |
| 5,473,117 | 12/1995 | Morgan et al. . | |
| 5,641,943 | 6/1997 | Sawamura . | |
| 5,984,710 | 11/1999 | Kodama . | |

FOREIGN PATENT DOCUMENTS

| | | |
|---|---|---|
| 0 687 037 | 12/1995 | (EP) . |
| 8-7944 | 1/1996 | (JP) . |
| 8-064267 | 3/1996 | (JP) . |

* cited by examiner

*Primary Examiner*—Dean A. Reichard
*Assistant Examiner*—Chau N. Nguyen
(74) *Attorney, Agent, or Firm*—Anthony J. Casella; Gerald E. Hespos; Michael J. Porco

(57) ABSTRACT

Drain twisted wires of a plurality of shielded cables are connected with a ground wire without using a joint connector. In a grounding construction for grounding metal fiber braided wires of a plurality of shielded cables by connecting drain twisted wires 10*a* to 10*f* made of the metal fiber braided wires with each other and with a ground wire 11, sheaths of the plurality of shielded cables are stripped at positions corresponding to a sheath stripping position for the longest drain twisted wire. The drain twisted wires are bundled with the ground wire by a tape 12 from the sheath stripping positions P1. Resistance welding then is applied to ends of the twisted wires exposed from the leading end of the tape and to a core exposed from one end of the ground wire. The other end of the ground wire then is grounded.

5 Claims, 5 Drawing Sheets

METHOD FOR MANUFACTURING A GROUNDING CONSTRUCTION FOR A PLURALITY OF SHIELDED CABLES AND A GROUNDING CONSTRUCTION

BACKGROUND OF THE INVENTION

1. Field of the Invention

The present invention relates to a method of manufacturing a grounding construction for a plurality of shielded cables, such as a plurality of shielded cables arranged in an automotive vehicle. The invention also relates to a grounding construction for a plurality of shielded cables, and particularly to a grounding construction to join a plurality of shielded cables and to connect the shielded cables to a ground wire without using a joint connector.

2. Description of the Related Art

A prior art shielded cable includes one or more core wires disposed in a braided metal wire tube. The braided wire tube then is covered with a sheath or insulation coating. The braided wire is provided for shielding, and hence needs to be grounded. Thus, as shown in FIGS. 4(A) and 4(B), end portions of sheaths 1*a* of prior art shielded cables 1 are stripped to expose the braided wires, and the exposed braided wires are formed into drain twisted wires 1*b*. Terminals 2 are mounted at the leading ends of the twisted wires 1*b* and are inserted into a joint connector 3 for connection with a joint terminal 4 in the joint connector 3. A terminal at one end of a ground wire 5 is connected with the joint terminal 4, and a terminal 6 at the other end of the ground wire 5 is grounded to a vehicle body panel or the like.

The sheath 1*a* is stripped at a position P where the leading end of the prior art shielded cable 1 is branched, as shown in FIG. 5. For example, since the length of a branch wire 1-*a* is 100 mm in the shielded cable 1A, the length of a drain twisted wire 1*b*-1 is 100 mm. Further, since the length of a branch wire 1-*b* is 200 mm in a shielded cable 1B, the length of a drain twisted wire 1*b*-2 is 200 mm. Furthermore, since the length of a branch wire 1-*c* is 300 mm in a shielded cable 1C, the length of a drain twisted wire 1*b*-3 is 300 mm. The terminals 2 are mounted at the leading ends of the drain twisted wires 1*b*-1 to 1*b*-3 for connection with the joint terminal 4 in the joint connector 3. Tubes 7 are designed for insulation and protection, and are mounted on the twisted wires between the stripping positions P and connecting portions with the joint connector 3.

If the joint connector is used to ground the metal fiber braided wires of the plurality of shielded cables, as described above, a large space is taken up. However, there generally is not much space remaining in the arrangement of shielded cables. Accordingly, it often is difficult to ensure a mount space for the joint connector. Further, the use of the joint connector leads to an increased number of parts, such as a joint terminal, a joint connector, and tubes. The use of the joint connector also leads to an increased number of operation steps including the mounting of the terminals and the connection of the connector. This increase in the number of parts and the more complicated assembly disadvantageously increases costs.

If the ends of the drain twisted wires and the end of the ground wire are welded together, the joint connector is unnecessary. Thus, a spatial problem can be solved, the number of parts can be reduced, and the number of operation steps can be reduced. However, as shown in FIG. 6, the drain twisted wires differ in length. Furthermore, the drain twisted wires have a low rigidity and are difficult to straighten. Therefore, the leading ends cannot be aligned easily, and it is impossible to apply local welding thereto at the present state.

In view of the above problems, an object of the present invention is to enable ends of drain wires of a plurality of shielded cables and an end of a ground wire to be locally end-processed, in particular connected or welded together, so that a joint connector can be dispensed with.

SUMMARY OF THE INVENTION

According to the invention, there is provided a method for manufacturing a grounding construction or arrangement for grounding a plurality of shielded cables by connecting shields of the plurality of shielded cables with each other and with a ground wire. The shields may be drain wires. The method may comprise stripping sheaths of the plurality of shielded cables at positions corresponding to a sheath stripping position for the longest shield. The method proceeds by bundling the shields with the ground wire by a bundling means from the sheath stripping positions. The method continues by locally applying an end processing to ends of the shields exposed from the leading end of the bundling means and to a core exposed from one end of the ground wire.

According to a preferred embodiment of the invention, the step of locally applying an end processing comprises a local application of resistance welding.

Preferably, in the stripping step a length between the sheath stripping positions and the local end processing position is about 150 mm. The method then may further comprise the step of cutting off leading end portions of the shields beyond this length. Additionally the bundling means employed in the bundling step is wound on a bundling length of about 130 mm to 135 mm from the sheath stripping positions so that the shields and the core of the ground wire substantially project from the leading end of the bundling means by about 15 mm to 20 mm. End processing then is applied to this projecting portion of the wire bundle.

The method may further comprise a step of mounting a cap, preferably made of an insulating resin, on the locally end processed wire ends.

Most preferably, the mounting step comprises a step of fixing a tongue projecting from an insertion opening of the cap to the bundle of the shields and the ground wire by a fixing means, preferably a tape.

According to the invention, there is further provided a grounding construction or arrangement for grounding a plurality of shielded cables by connecting shields, in particular drain wires of the plurality of shielded cables with each other and with a ground wire. The shields may be drain wires of the plurality of shielded cables. Ends of the shields exposed from the plurality of shielded cables and a core exposed from one end of the ground wire are locally end-processed to form a locally end-processed portion. The locally end-processed portion is adjacent an end-processing position that is spaced by a predetermined bundling length from a stripping position. The stripping position is the position to which the shields are exposed by stripping sheaths of the plurality of shielded cables and corresponds to a sheath stripping position for the longest shield. The shields are bundled with the ground wire by a bundling means over the bundling distance.

According to a preferred embodiment, the shields comprise drain twisted wires preferably made of metal fiber braided wires and/or a conductive film or layer.

Preferably, a length between the sheath stripping positions and the local end processing position is about 150 mm. Leading end portions of the shields beyond this length are cut off, and the bundling means is wound on a bundling length of about 130 mm to 135 mm from the sheath stripping positions. Thus the shields and the core of the ground wire substantially project from the leading end of the bundling means by about 15 mm to 20 mm, and this projecting portion of the wire bundle is end-processed. The bundling means preferably comprises a tape.

A cap made of an insulating resin, may be mounted on the locally end processed wire ends. A tongue may project from an insertion opening of the cap preferably and may be fixed to the bundle of the shields and the ground wire by a fixing means, preferably a tape.

According to a further preferred embodiment of the invention, there is provided a grounding construction for grounding a plurality of shielded cables by connecting drain twisted wires made of metal fiber braided wires of the plurality of shielded cables with each other and with a ground wire. Sheaths of the plurality of shielded cables are stripped at positions corresponding to a sheath stripping position for the longest drain twisted wire. The drain twisted wires are bundled with the ground wire by a tape from the sheath stripping positions. Resistance welding then is applied locally to ends of the twisted wires that are exposed from the leading end of the tape and to a core that is exposed from one end of the ground wire. The other end of the ground wire is grounded.

The longest drain twisted wire means that the length of the core wire from a branched position of the shielded cable at its leading end is longest. Therefore, if the other shielded cables have shorter core wires, the sheath stripping positions thereof are located beyond their core wire branched positions.

More specifically, if description is made using the prior art shown in FIG. 5, the drain twisted wires 1*b*-1, 1*b*-2 are made to have a length of 300 mm which is equal to the length of the longest drain twisted wire 1*b*-3.

If the sheath stripping positions are aligned as above, the drain twisted wires can be bundled and fixed by the tape from the sheath stripping positions. During this taping, the ground wire is bundled and fixed together. Thus, the drain twisted wires which are individually not rigid are allowed to have a sufficient rigidity by being bundled, which makes it possible to align the ends of the twisted wires. The drain twisted wires of the shielded cables can be connected with each other and with the ground wire without using a joint connector by locally welding the ends of the twisted wires together and aligned by taping in this way by resistance welding to be electrically connected with the core of the ground wire.

For example, in a most preferable embodiment of the invention, the length between the sheath stripping positions and the locally resistance-welded portion is set at about 150 mm and the leading end portions of the twisted wires beyond this length are cut off. The tape then is wound by 130 mm to 135 mm from the sheath stripping positions so that the twisted wires and the core of the ground wire project by 15 mm to 20 mm from the leading end of the tape. Resistance welding then is applied to this projecting portion of the wire bundle.

More specifically, the length from the ends necessary for the end local resistance welding is about 150 mm. Thus, the twisted wires need to have a length of 150 mm from the sheath stripping positions and the redundant twisted wires beyond this length are cut off. Since a dimension of the welded portion is about 15 mm, the ground wire and the drain twisted wires are fixed by taping about 135 mm (150 mm−15 mm=135 mm) from the sheath stripping position so that the ends of the drain twisted wires and the core of the ground wire are exposed by about 15 mm from the end of the taping. Since the twisted wires and the core project only by 15 mm from the end of the taping, they can be held together without being scattered and resistance welding can be applied to this assembly of the twisted wires and the core.

A cap made of an insulating resin is mounted on the locally resistance-welded end portions, and a tongue projecting from an insertion opening of the cap is fixed to the bundle of the twisted wires and the ground wire by another tape.

The locally welded end portion is insulated and protected by mounting the cap and the tape is wound by about 135 mm up to the sheath stripping positions as described above. Thus the joint portion may be hung from the plurality of shielded cables, the ground wire or a wiring harness formed by bundling other wires. Thus, this takes up less space than a prior arrangement that uses a joint connector. Further, many operation steps, including mounting of terminals and mounting on a connector, are necessary in prior art arrangements that employ a joint connector. However, according to the invention, the number of operation steps can be reduced considerably.

These and other objects, features and advantages of the present invention will become more apparent upon a reading of the following detailed description and accompanying drawings.

DETAILED DESCRIPTION OF THE PREFERRED EMBODIMENT

Figure 1:
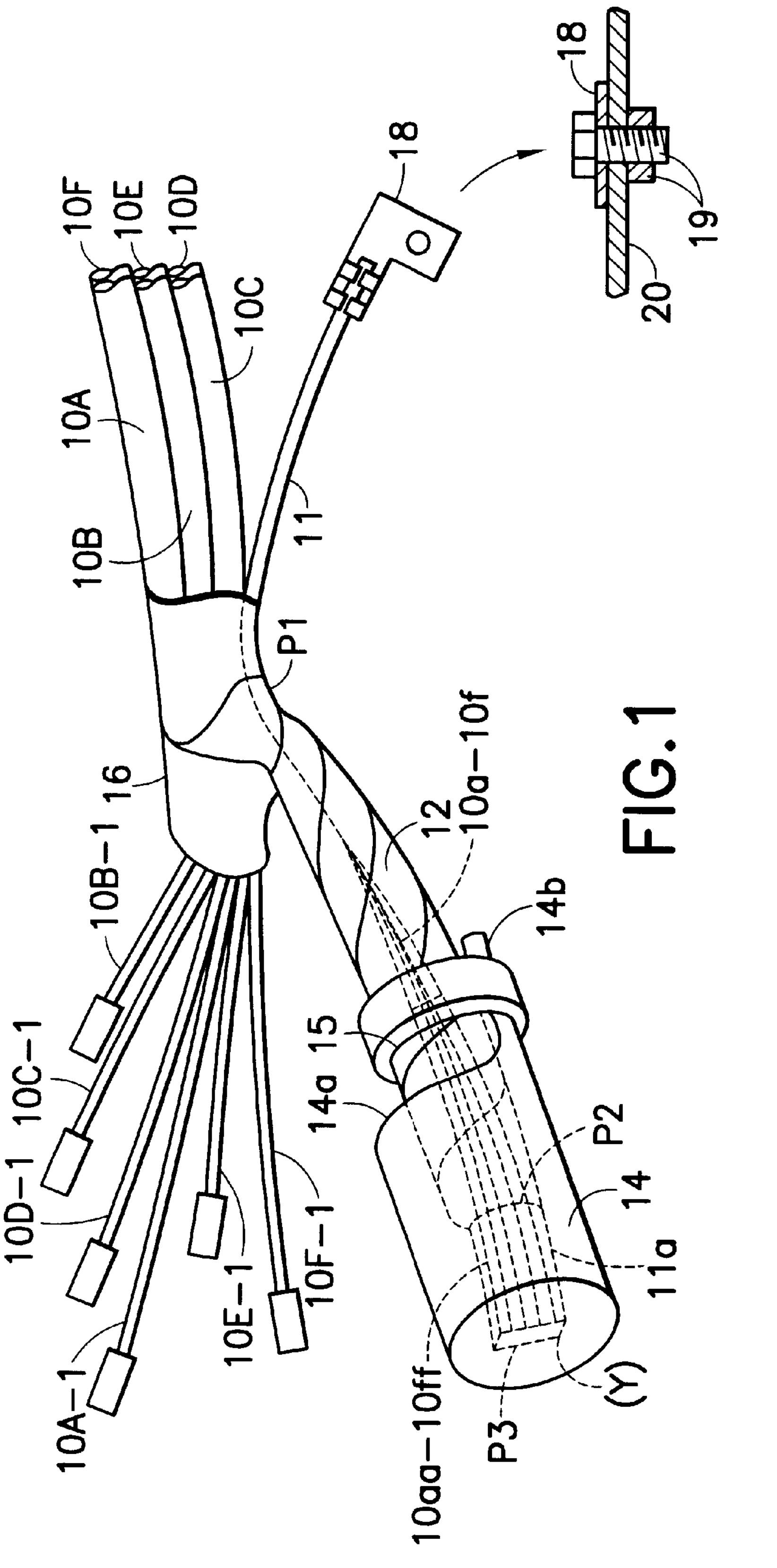
FIG. 1 is a perspective view of one embodiment of the invention.

In the illustrated embodiment, drain braided wires 10*a* to 10*f* of six shielded cables 10A to 10F are bundled and fixed with a ground wire 11 by a tape, clamp or similar insulated fixing means 12 from positions P1 where sheaths 10*a*' to 10*f*' of the respective shielded cables 10A to 10F are stripped. A resistance welding, soldering or other such end processing then is applied to leading ends 10*aa* to 10*ff* of the drain braided wires 10*a* to 10*f* that are exposed from the leading end of the tape 12 and a core 11*a* is exposed at the leading end of the ground wire 11, thereby providing a locally processed or welded end portion (Y).

A cap 14 made, for example, of an insulating resin is mounted on the locally welded end portion. A tongue or projection or tab 14*b* projects from an insertion opening 14*a* of the cap 14, and is tied to the wound portion of the tape 12 by another tape, clamp or similar insulated fixing means 15, thereby securely ensuring insulation and protection for the locally welded end portion (Y).

The ground wire 11 that has been welded or otherwise connected with the drain twisted wires and wound therewith by the tape 12 is bundled with the six shielded cable 10A to 10F by a tape or other fixing means 16. The ground wire 11 then is separated from the bundle at a specified position. A ground terminal 18 is connected at the separated end of the ground wire 11, and is fixed to a vehicle body panel 20 by a bolt-and-nut unit 19 to establish a ground.

Figure 2:
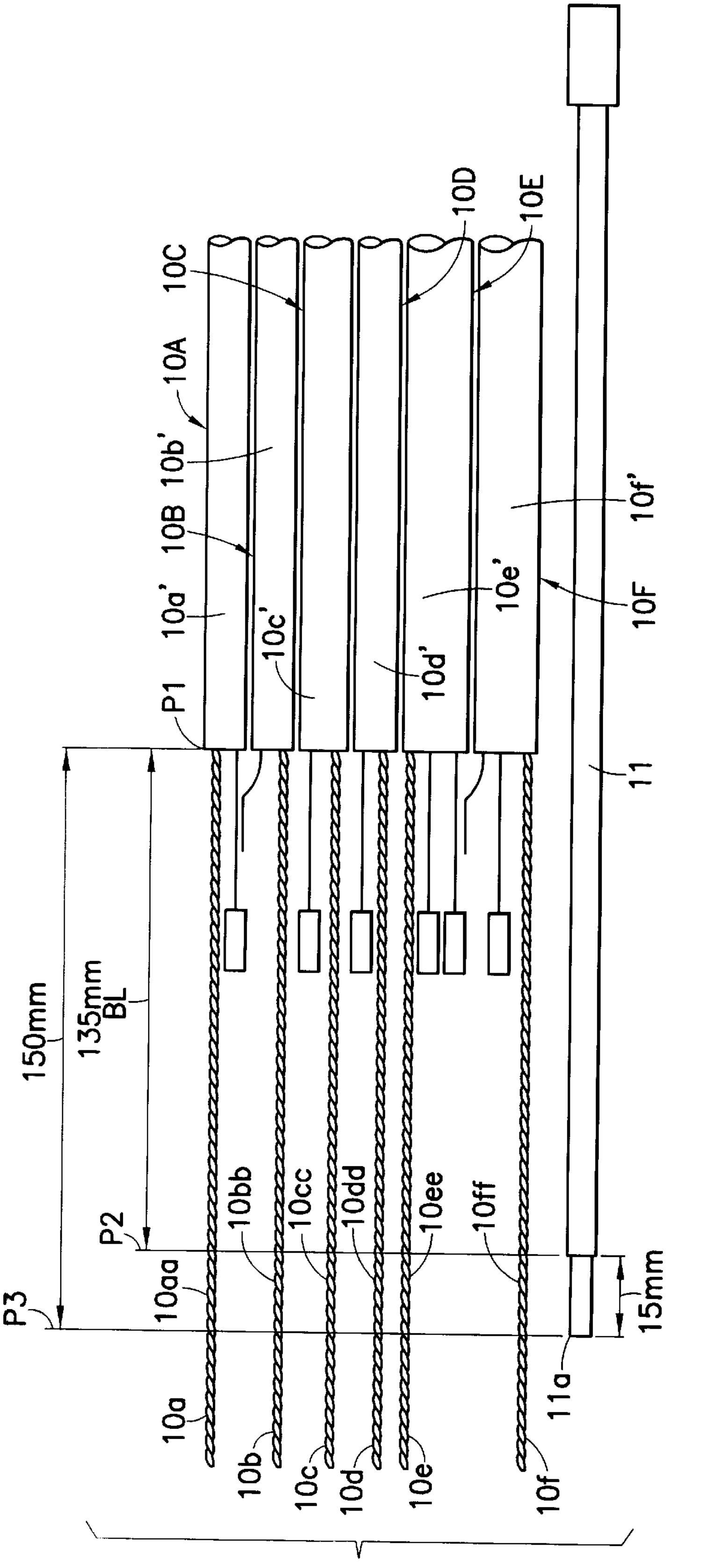
FIG. 2 is a diagram showing a part of an operation step.

The grounding construction of the subject invention is assembled, as described below. First, as shown in FIG. 2, the six cables 10A to 10F that are to be bundled by the tape 16 have their sheaths 10*a*' to 10*f*' stripped from their leading ends to substantially the same positions P1. The stripping positions P1 are aligned substantially with the stripping position P1 of the shielded cable 10A that has the longest core wire 10A-1.

The core wires 10B-1 to 10F-1 of the other five shielded cables 10B to 10F preferably are substantially shorter than the core wire 10A-1 of the shielded cable 10A. Conventionally, the sheath stripping positions of these core wires are set more toward the leading ends of the shielded cables than the sheath stripping positions P1. In the present invention, these shielded cables 10B to 10F also have their sheaths 10*a*' to 10*f*' stripped up to the positions P1.

Next, the drain twisted wires 10*a* to 10*f* that were formed by twisting the metal fiber braided wires are exposed by stripping the sheaths 10*a*' to 10*f*'.

A leading end portion of the ground wire 11 made e.g. of a usual wire is arranged in alignment with the drain twisted wires 10*a* to 10*f*. The length of the portion of the ground wire 11 substantially aligned with the drain twisted wires 10*a* to 10*f* is 150 mm from the sheath stripping position P1, and the core 11*a* is exposed in advance at its leading end e.g. by 15 mm.

Figure 3:
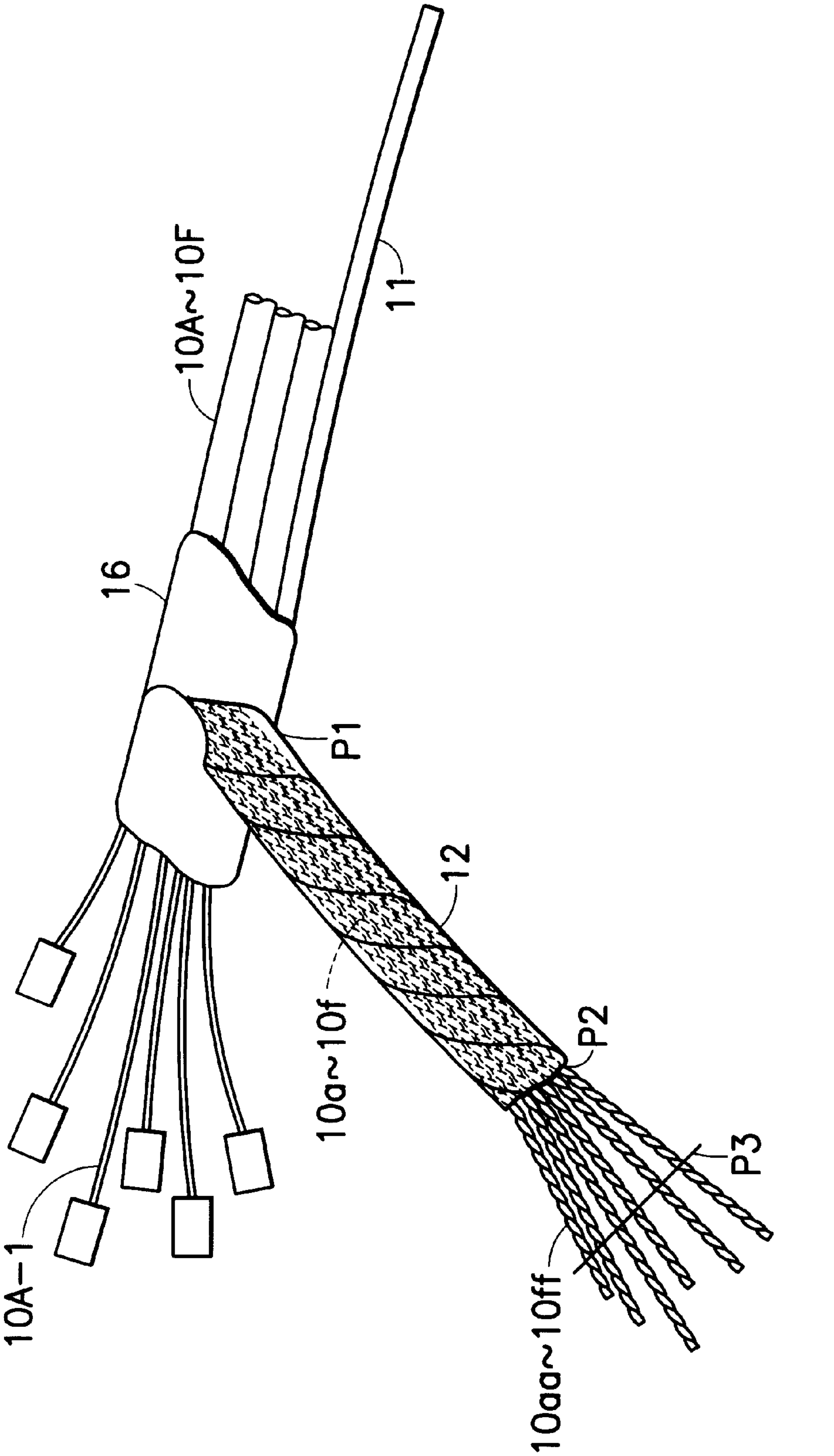
FIG. 3 is a diagram showing a part of another operation step.
Figure 4A:
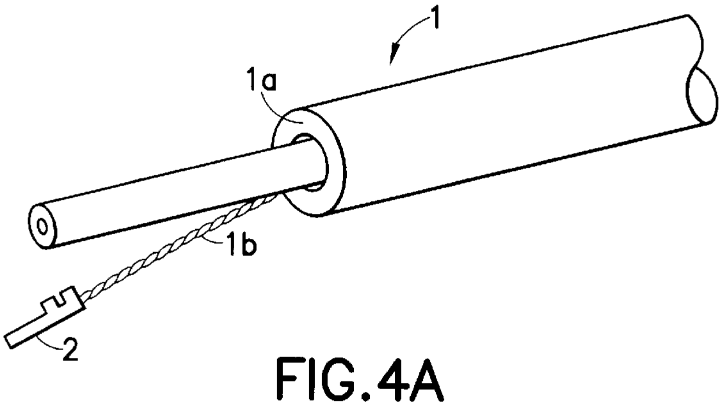
FIG.4A PRIOR ART
FIGS. 4(A) and 4(B) are diagrams showing a prior art grounding construction.
Figure 4B:
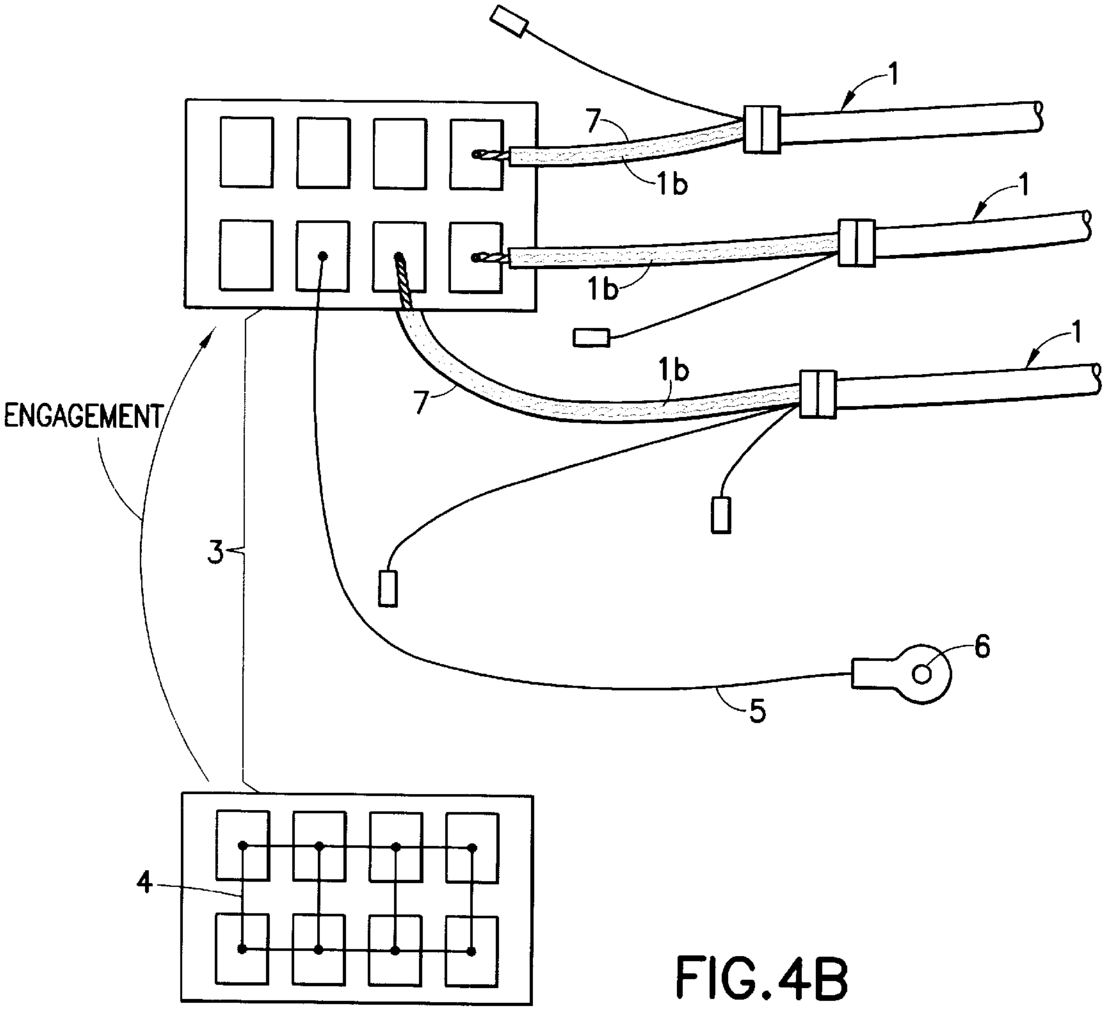
FIG.4B PRIOR ART
Figure 5:
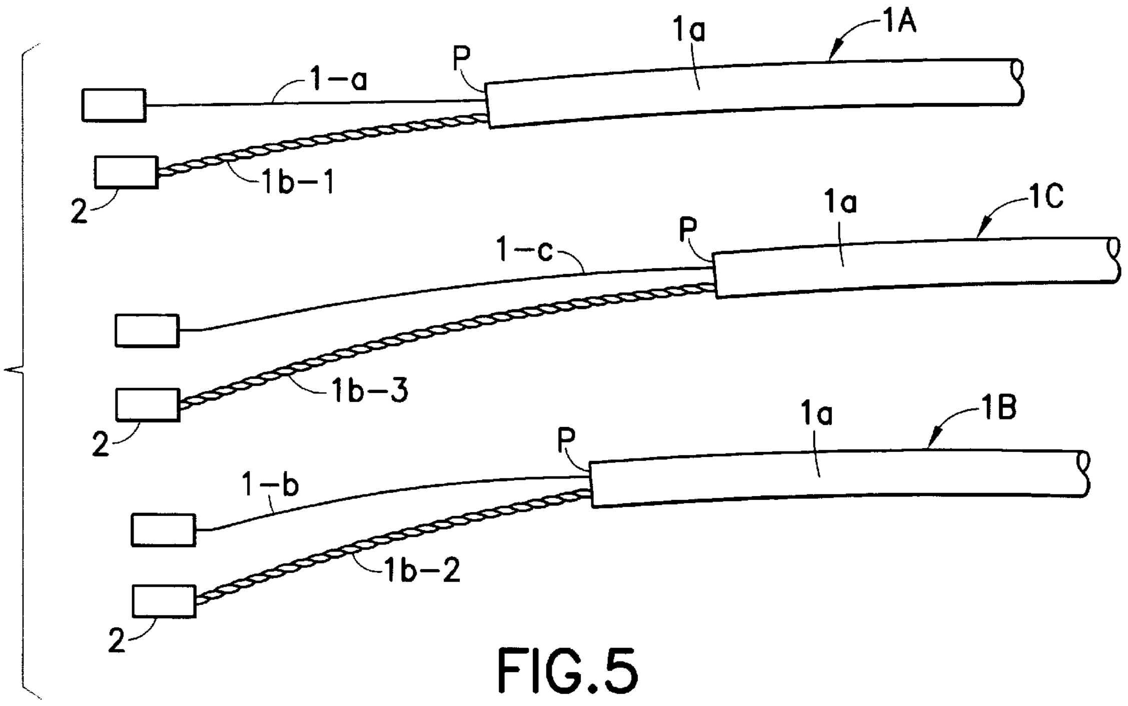
FIG.5 PRIOR ART
FIG. 5 is a diagram showing sheath-stripping positions in the prior art grounding construction.
Figure 6:
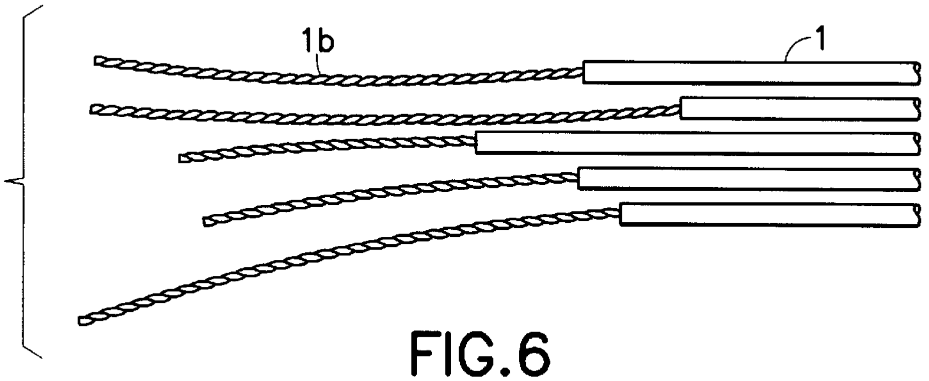
FIG.6 PRIOR ART
FIG. 6 is a diagram showing a problem of the prior art grounding construction.

As shown in FIG. 3, the drain twisted wires 10*a* to 10*f* and the ground wire 11 are tied by the tape 12 from the stripping position P1 to the position P2 which is e.g. 135 mm away from the position P1 to bundle and protect the six drain twisted wires 10*a* to 10*f* and the ground wire 11.

Next, portions of the drain twisted wires 10*a* to 10*f* still extending beyond a cutting position P3 which is e.g. 15 mm away from the winding end position P2 are cut off. As a result, the end portions of the six drain twisted wires 10*a* to 10*f* and the core 11*a* of the ground wire 11 are bundled by the tape 12 on a bundling length or distance BL of preferably about 130 to 135 mm and project while having the leading ends thereof substantially aligned.

Next, an end-processing, preferably resistance welding is applied to the wire bundle between the positions P2 and P3 to unite the individual wires, thereby forming the locally processed or welded end portion (Y). Thus, the drain twisted wires 10*a* to 10*f* of the shielded cables 10A to 10F and the core 11*a* of the ground wire 11 are joined to establish an electrical connection.

Finally, the insulating resin cap 14 is mounted on the locally welded end portion (Y), and the tongue 14*b* is tied to the wound portion of the tape 12 by another tape 15.

The connected portion of the drain twisted wires and the grounded wire preferably extends only by about 150 mm from the shielded cable and is protected by the half wrapping of the tape 12. Additionally, the cap 14 protects the locally welded end portion (Y). Accordingly, the insulation/protection is ensured for this connected portion, and can be hung as it is from a harness main body that is formed by bundling the shielded cables. It should be noted that the connected portion may be turned up and fixed to the harness main body by taping. When the harness is mounted in an automotive vehicle, the ground terminal 18 connected at the other end of the ground wire 11 is or can be fixed to the vehicle body panel 20 by the bolt-and-nut unit 19 to establish a ground.

As described above, the sheath stripping step and the braided wire twisting step need are performed in this assembling operation as in the prior art. However, after these steps, only steps of taping the drain twisted wires and the ground wire, applying resistance welding to their leading ends, and mounting the insulating cap thereon are performed. Therefore, the assembling operation is simpler than the prior art.

As is clear from the above description, the ends of the drain twisted wires of the plurality of shielded cables and the core at the end of the ground wire can be aligned with one another and connected by resistance welding. Accordingly, the joint connector required for the prior art can be dispensed with, thereby avoiding a need for a mount space of the joint connector. Therefore, the drain twisted wires of the shielded cables and the ground wire can be connected even at a location where there is not much space.

Further, since parts including a joint connector and a joint terminal can also be dispensed with, the number of parts and the number of operation steps can be reduced, thereby reducing costs.

Even though the invention has been described with reference to an embodiment in which the shielded cables comprise a shield made of braided wires, it is to be understood that the invention is also applicable to shielded cables having other types of shields or shielding such as a shielding made of a conductive film or layer e.g. a metal film shield or a combination of drain wires and a metal film shield or layer.

What is claimed is:

1. A grounding construction, comprising:

a ground wire (11) having an end, a core (11*a*) extending from the end and an insulation around the core (11*a*), a portion of the insulation being removed from the core(11*a*) adjacent the end;

a plurality of shielded cables (10A–F), each said shielded cable (10A–F) having an end, said shielded cables (10A–F) being formed respectively with shields (10*a*–*f*) and sheaths (10*a*'–*f*') surrounding the respective shields (10*a*–*f*), one of said shields (10*a*–*f*) defining a longest shield (10*a*), portions of the respective sheaths (10*a*'–*f*') being removed from a sheath stripping position (P1) to the end of the respective shielded cable (10A–F), such that the respective shields (10*a*–*f*) each have exposed ends (10*aa*–*ff*), the exposed ends (10*aa*–*ff*) of the shields (10*a*–*f*) and the exposed core (11*a*) at the end of the ground wire (11) being locally end-processed to form a locally end-processed portion (Y) extending from the respective ends of the shielded cables (10A–F) and the ground wire(11) to a bundling means end position (P2) which is spaced from the sheath stripping position (P1) by a predetermined bundling length (BL) and which corresponds to the sheath stripping position (P1) for the longest shield (10*a*); and a bundling means (12) surrounding and bundling the shields (10*a*–*f*) and the ground wire (11) over the bundling length (BL).

2. A grounding construction according to claim 1, wherein the shields (10*a*–*f*) comprise drain wires (10*a*–*f*) made of metal fiber braided wire.

3. A grounding construction according to claim 2, wherein a length between the sheath stripping positions (P1) and the local end processing position is about 150 mm, wherein the exposed ends (10*aa*–*ff*) of the shields (10*a*–*f*) beyond this length are cut off, and wherein the bundling length (BL) is about 130 mm to 135 mm from the sheath stripping positions (P1) so that the shields (10*a*–*f*) and the core (11*a*) of the ground wire (11) substantially project from the leading end of the bundling means (12) by about 15 mm to 20 mm, and this projecting portion of the wire bundle is end-processed.

4. A grounding construction according to claim 3, wherein the bundling means (12) comprises a tape (12).

5. A grounding construction according to claim 1, wherein a cap (14) made of an insulating resin is mounted on the locally end processed wire ends (10*a*–*f*; 11), the cap (14) having an insertion opening (14*a*) and a tongue (14*b*) projecting from the insertion opening (14*a*), the tongue (14*b*) of the cap (14) being fixed to the bundle of the shields (10*a*–*f*) and the ground wire (11) by a tape (15).

* * * * *